(12) United States Patent
Rubinstein et al.

(10) Patent No.: US 7,573,643 B2
(45) Date of Patent: Aug. 11, 2009

(54) METHOD AND APPARATUS FOR DESIGNING TRANSMISSIVE OPTICAL SURFACES

(75) Inventors: Jacob Rubinstein, Misgav (IL); Gershon Wolansky, Jerusalem (IL)

(73) Assignee: Technion Research & Development Foundation Ltd., Haifa (IL)

( * ) Notice: Subject to any disclaimer, the term of this patent is extended or adjusted under 35 U.S.C. 154(b) by 315 days.

(21) Appl. No.: 11/504,705

(22) Filed: Aug. 16, 2006

(65) Prior Publication Data

US 2008/0043339 A1 Feb. 21, 2008

(51) Int. Cl.
*G02B 3/00* (2006.01)
(52) U.S. Cl. ...................................... 359/642
(58) Field of Classification Search ............ 359/642
See application file for complete search history.

(56) References Cited

U.S. PATENT DOCUMENTS

| | | | |
|---|---|---|---|
| 5,067,067 A | 11/1991 | Estelle et al. | |
| 6,256,098 B1 | 7/2001 | Rubinstein et al. | |
| 6,273,596 B1 * | 8/2001 | Parkyn, Jr. ................ | 362/522 |
| 6,909,854 B1 * | 6/2005 | Kleiner et al. ............. | 398/201 |

FOREIGN PATENT DOCUMENTS

| | | |
|---|---|---|
| EP | 0940702 | 9/1999 |
| JP | 11-316338 | 11/1999 |
| WO | WO 01/92948 | 12/2001 |
| WO | WO 02/086592 | 10/2002 |
| WO | WO 2008/020440 | 2/2008 |

OTHER PUBLICATIONS

Angenent et al. "Minimizing Flows for the Monge-Kantorovich Problem", SIAM Journal on Mathematical Analysis, 35(1): 61-97, 2003.
Brenier "Polar Factorization and Monotone Rearrangement of Vector-Valued Functions", Communications on Pure and Applied Mathematics, 44(4): 375-417, 1991.
Davidson et al. "Optical Coordinate Transformations", Applied Optics, 31(8): 1067-1073, 1992.
Glimm et al. "Optical Design of Two-Reflector Systems, the Monge-Kantorovich Mass Transfer Problem and Fermat's Principle", Indiana University Mathematics Journal, 53(5): 1255-1277, 2004.
Lee et al. "Phase Reconstruction by the Weighted Least Action Principle", Journal of Optics A: Pure and Applied Optics, 8: 279-289, 2006.
Rubinstein et al. "A Variational Principle in Optics", Journal of the Optical Society of America A, 21(11): 2164-2172, 2004.

(Continued)

*Primary Examiner*—Scott J Sugarman

(57) ABSTRACT

A method of designing a transmissive optical element for converting a profile of a light beam from a predetermined input profile to a predetermined output profile is disclosed. The method comprises: calculating a stationary function of a predetermined cost functional selected such that the stationary function satisfies a mapping condition for mapping the predetermined input profile into the predetermined output profile, thereby providing a mapping function. The method further comprises utilizing the mapping function for calculating surface properties of at least a first surface and a second surface of the transmissive optical element.

46 Claims, 8 Drawing Sheets

OTHER PUBLICATIONS

Rubinstein et al. "Reconstruction of Optical Surfaces From Ray Data", Optical Review, 8(4): 281-283, 2001.
Rubinstein et al. "A Weighted Least Action Principle for Dispersive Waves", Annals of Physics, 316(2): 271-284, Apr. 2005.
International Search Report Dated Apr. 10, 2008 From the International Searching Authority Re.: Application No. PCT/IL2007/001018.
Official Action Dated Sep. 26, 2008 From the US Patent Office Re.: U.S. Appl. No. 11/504,705.

Written Opinion Dated Apr. 10, 2008 From the International Searching Authority Re.: Application No. PCT/IL2007/001018.

\* cited by examiner

METHOD AND APPARATUS FOR DESIGNING TRANSMISSIVE OPTICAL SURFACES

FIELD AND BACKGROUND OF THE INVENTION

The present invention relates to optics and, more particularly, to a method and apparatus for designing optical surfaces capable of providing a light beam having a predetermined profile.

Optical beam-shaping systems generally are arrangements of optical elements by which a bundle of rays of light irradiated upon such elements is modified in a defined way with respect to its beam parameters. It is required in the main cases of practical application that a bundle of rays has a defined geometric shape with respect to its cross section, e.g., a circular, rectangular or lattice-like shape or the like, and an intensity profile defined across its cross section. Both properties frequently have to be influenced simultaneously. For example if the light source delivering the incoming bundle of rays supplies a bundle of rays with irregular intensity distribution and irregular geometric dimensions, but defined specifications have to be satisfied for the outgoing bundle of rays of the beam-shaping system with respect to its properties.

The problem of intensity control for light beams is important in many fields. In laser applications, for example, particular importance is attached to both the quality of the beam produced by a laser and the shaping of that beam for the desired use. A laser device generally produces a beam of coherent light that has a wavefront of relatively small cross-section. In spite of the small cross-section and the coherency of the beam, the wavefront of a laser typically has a non-uniform power distribution that is stronger in the center than at the outer edges. The laser output beam quality and shape determine the quality, quantity and efficiency of work piece machining. The power variation may be between five and ten percent and if not reshaped to produce a uniform distribution may result in uneven machining over the work piece surface. Furthermore, to make use of the beam, it is often necessary to expand the cross-sectional area of the beam, thereby spreading the non-uniformity across a larger wavefront. This is because when conventional lenses are used to expand the beam, the non-uniform power distribution of the wavefront is carried through to the expanded beam.

Intensity control for light beams is also required in the area of communication whereby optical signals have to be transmitted between various optical components. A conventional light-emitting module incorporated in an optical communications system generally includes a light source (e.g., a laser diode), an optical fiber and a lens interposed between the light source and optical fiber for converging the light beam onto the core of the optical fiber. It is recognized that the communication efficiency depends on the ability of the lens to provide the optical signal passing with the proper intensity profile so as to reduce coupling losses.

An additional application in which it is required to control the intensity profile of a light beam is optical scanning. Optical scanners, such as bar code scanners, typically make use of light from laser diodes which are moved to provide the scanning beam. Such diodes are robust and relatively inexpensive, but they suffer from the disadvantage that the beam emerging from a laser diode is astigmatic. When a bar code symbol is to be scanned it is generally desirable for the beam width to be relatively small at the point at which it impinges upon the bar code symbol, to provide proper discrimination between the bars and spaces. On the other hand, it is desirable to have the perpendicular dimension relatively large to minimize noise. It is therefore desired to control the intensity profile of such optical scanners to allow noise free reading with minimal astigmatism.

In lighting modules, such as those used in the theater, television, touring productions and architectural applications, it is oftentimes desired to control the intensity profile of a light beam, as well as the hue, saturation, and color profile to obtain a particular artistic effect.

The activity in the area of light beam intensity profile has grown considerably over the past two decades. Known designs for shaping the light beam are typically based on symmetry assumptions. Thus, light beams have traditionally been assumed to have an intensity profile that depends on a single coordinate, a radial intensity profile, a product of one-dimensional profiles, and the like. Such assumptions have heretofore reduces the design problem to one spatial dimension which enabled the formulation of a solvable mathematical equation.

One method of designing a beam-shaping system without imposing symmetry assumptions is disclosed in an article by T. Glimm and V. Oliker entitled "Optical design of two-reflector systems, the Monge-Kantorovich mass transfer problem and Fermat's principle", published in Indiana Univ. Math. J. 53:1255-1277, 2004. Glimm et al. design a beam-shaping system for transforming an incoming beam having a plane wave front with given intensity into an outgoing beam having a plane front with prescribed output intensity. The beam-shaping system includes a first reflector and a second reflector. An incoming beam is reflected off the first reflector which transforms it into an intermediate beam, propagation in the direction of the second reflector. The intermediate beam impinges on the second reflector, which transforms it into an outgoing beam of the desired shape. Unlike other methods, Glimm et al. do not impose a priori assumptions on the symmetry of the incoming light beam and the two-reflector beam-shaping system does not have to be symmetric. However, since the two reflectors are non-planar, they have to be accurately aligned to provide the desired output intensify profile. Any misalignment of the reflectors varies the intensity profile of the outgoing light beam and results in a reduced efficiency. The alignment requirement introduces complications in the fabrication process of the system.

There is thus a widely recognized need for, and it would be highly advantageous to have a method and apparatus for designing transmissive optical surfaces, devoid of the above limitations.

SUMMARY OF THE INVENTION

According to one aspect of the present invention there is provided a method of designing a transmissive optical element for converting a profile of a light beam from a predetermined input profile to a predetermined output profile. The method comprises calculating a stationary function of a predetermined cost functional selected such that the stationary function satisfies a mapping condition for mapping the predetermined input profile into the predetermined output profile, thereby providing a mapping function. The method further comprises utilizing the mapping function for calculating surface properties of at least a first surface and a second surface of the transmissive optical element, thereby designing the transmissive optical element.

According to further features in preferred embodiments of the invention described below, the predetermined input profile comprises a predetermined input intensity profile, and the predetermined output profile comprises a predetermined output intensity profile.

According to still further features in the described preferred embodiments the predetermined input profile and the predetermined output profile form an asymmetric pair of profiles.

According to another aspect of the present invention there is provided a method of designing a transmissive optical element. The method comprises receiving an input intensity profile, an input phase profile, an output intensity profile and an output phase profile, with the provision that the input and the output intensity profiles form an asymmetric pair. The method further comprises employing an optimization procedure for calculating surface properties of at least a first surface and a second surface of the transmissive optical element, thereby designing the transmissive optical element.

According to further features in preferred embodiments of the invention described below, the optimization procedure comprises calculation of a stationary function of a cost functional.

According to still another aspect of the present invention there is provided a method of manufacturing a transmissive optical element, comprises executing the method described herein thereby designing the first surface and the second surface and forming the first surface and the second surface thereby manufacturing the transmissive optical element.

According to yet another aspect of the present invention there is provided a transmissive optical element designed by the method described herein.

According to further features in preferred embodiments of the invention described below, the calculation of the stationary function comprises solving a predetermined evolution equation.

According to still further features in the described preferred embodiments the calculation of the stationary function comprises performing an iterative process.

According to still further features in the described preferred embodiments the calculation of the mapping function comprises selecting an initial mapping function at least partially satisfying the mapping condition, and evolving the initial mapping function using the predetermined evolution equation.

According to still further features in the described preferred embodiments the calculation of the surface properties comprises calculating a shape of the first surface and a shape of the second surface.

According to still further features in the described preferred embodiments the calculation of the surface properties comprises calculating a diffraction function of the first surface and a diffraction function of the second surface.

According to still further features in the described preferred embodiments the method further comprises selecting a plurality of input collimating surfaces and using the plurality of input collimating surfaces for mapping the input profile to a collimated input profile characterized by a planar wavefront and an input intensity profile.

According to still further features in the described preferred embodiments the method further comprises selecting a plurality of output collimating surfaces and using the plurality of output collimating surfaces for backward mapping the output profile to a collimated output profile characterized by a planar wavefront and an output intensity profile.

According to still further features in the described preferred embodiments the calculation of the surface properties comprises, using the mapping function for calculating a gradient of a surface function describing properties of the first surface, using an inverse of the mapping function for calculating a gradient of a surface function describing properties of the second surface, and calculating the surface properties based on the gradients.

According to an additional aspect of the present invention there is provided apparatus for designing a transmissive optical element for converting a profile of a light beam from a predetermined input profile to a predetermined output profile. The apparatus comprises: a stationary function calculator, configured to calculate a stationary function of a predetermined cost functional selected such that the stationary function satisfies a mapping condition for mapping the predetermined input profile into the predetermined output profile, thereby to provide a mapping function. The apparatus further comprises a surface property calculator configured to utilize the mapping function for calculating surface properties of at least a first surface and a second surface of the transmissive optical element.

According to yet an additional aspect of the present invention there is provided a transmissive optical element designed by the apparatus described herein.

According to further features in preferred embodiments of the invention described below, the stationary function calculator comprises an evolver configured to solve a predetermined evolution equation.

According to still further features in the described preferred embodiments the evolver is configured to select an initial mapping function at least partially satisfying the mapping condition, and to evolve the initial mapping function using the predetermined evolution equation.

According to still further features in the described preferred embodiments the surface property calculator is configured to calculate a shape of the first surface and a shape of the second surface.

According to still further features in the described preferred embodiments the surface property calculator is configured to calculate a diffraction function of the first surface and a diffraction function of the second surface.

According to still further features in the described preferred embodiments the apparatus further comprises an intensity mapping unit configured to receive surface data of a plurality of input collimating surfaces and to use the surface data for mapping the input profile to a collimated input profile characterized by a planar wavefront and an input intensity profile.

According to still further features in the described preferred embodiments the predetermined output profile is characterized by a non-planar wavefront.

According to still further features in the described preferred embodiments the apparatus further comprises an intensity mapping unit configured to receive surface data and to use the surface data for backward mapping the output profile to a collimated output profile characterized by a planar wavefront and an output intensity profile.

According to still further features in the described preferred embodiments the surface property calculator is configured for using the mapping function to calculate a gradient of a surface function describing properties of the first surface, using an inverse of the mapping function to calculate a gradient of a surface function describing properties of the second surface, and calculating the surface properties based on the gradients.

According to still an additional aspect of the present invention there is provided a transmissive optical element. The transmissive optical element comprises at least a first surface and a second surface designed and constructed for converting a profile of a light beam from a predetermined input profile to a predetermined output profile, wherein the predetermined input profile and the predetermined output profile form an asymmetric pair of profiles.

According to further features in preferred embodiments of the invention described below, the first surface and the second surface are characterized by a mapping function satisfying a mapping condition from the predetermined input profile into the predetermined output profile, wherein the mapping function has a predetermined relation to a gradient of the first surface and a gradient of the second surface, and is a stationary function of a predetermined cost functional.

According to still further features in the described preferred embodiments the mapping condition comprises energy conservation and transmission condition.

According to still further features in the described preferred embodiments the first surface and a second surface are curved surfaces of a lens.

According to still further features in the described preferred embodiments the first surface and a second surface are surfaces of a diffractive optical element.

According to still further features in the described preferred embodiments at least one of the predetermined input profile and the predetermined output profile is characterized by a substantially planar wavefront.

According to still further features in the described preferred embodiments the predetermined input profile is characterized by a non-planar wavefront.

According to still further features in the described preferred embodiments the transmissive optical element further comprises at least one collimator for collimating light prior to impingement on the first surface and/or decollimating light subsequently to impingement on the second surface.

The present invention successfully addresses the shortcomings of the presently known configurations by providing a method and apparatus for designing and manufacturing a transmissive optical element, and a transmissive optical element enjoying properties far exceeding conventional transmissive optical elements.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 5b illustrates shapes of surfaces calculated according to various exemplary embodiments of the present invention so as to allow conversion of a uniform input intensity profile to the asymmetric output intensity profile shown in FIG. 5a;

DESCRIPTION OF THE PREFERRED EMBODIMENTS

Figure 1A:
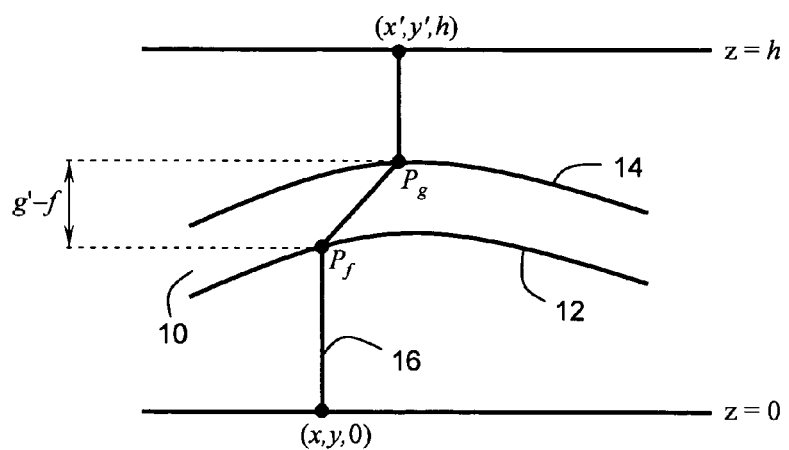
FIGS. 1a-b are schematic illustrations of a transmissive optical element, according to various exemplary embodiments of the present invention.

The present embodiments comprise a method and optical element which can be used for transmitting a light beam. Specifically, the present embodiments can be used to provide a light beam having a predetermined profile.

The principles and operation of a method and optical element according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present embodiments provide a method and apparatus suitable for designing an optical element for converting a profile of a light beam. The method and apparatus of the present embodiments are particularly useful for designing a transmissive optical element, whereby the light beam is transmitted from one side of the optical element to the other by passing through surfaces of the optical element. Thus, each surface of the optical element of the present embodiments is transmissive. This is in sharp distinction to the technique disclosed by Glimm and Oliker supra in which the incoming beam is reflected off the first reflector to propagate in the direction of the second reflector, where it is being reflected again.

The advantage of a transmissive optical element over the reflective optical element of Glimm and Oliker is that the transmissive optical element of the present embodiments can be manufactured from a bulk martial which can be positioned in the optical path of the beam. The light beam impinges on one side of the bulk martial, propagate within the bulk martial and exit through the opposite side, with minimal or no change in the optical path of the beam.

A light beam is typically described as a plurality of light rays which can be parallel, in which case the light beam is said to be collimated, or non-parallel, in which case the light beam is said to be non-collimated.

A light ray is mathematically described as a one-dimensional mathematical object. As such, a light ray intersects any surface which is not parallel to the light ray at a point. A light beam therefore intersects a surface which is not parallel to the beam at a plurality of points, one point for each light ray of the beam. Generally, a profile of the light beam refers to an optical characteristic (intensity, phase, frequency, brightness, hue, saturation, etc.) or a collection of optical characteristics of the locus of all such intersecting points. In various exemplary embodiments of the invention the profile comprises the intensity of the light and, optionally, one or more other optical characteristics.

Typically, but not obligatorily, the profile of the light beam is measured at a planar surface which is substantially perpendicular to the propagation direction of the light.

The locus of points at which all light rays of the beam has the same phase is referred to as the wavefront of the beam. For a collimated light beam, for example, the wavefront is a plane perpendicular to the propagation direction of the light, and the light is said to have a planar wavefront.

Thus, the term "profile" is used to optically characterize the light beam at its intersection with a given surface, while the term "wavefront" is used to geometrically characterize a surface for a given optical property (phase).

Since the profile, as explained, can include one or more optical characteristics of a locus of points on a surface, it can be represented by one or more two-dimensional profile functions which return the optical characteristics of a point on the surface, given the two-dimensional coordinates of the point. A general profile function is denoted by $\Gamma_j(\xi,\eta)$, where the index j represents the type of optical characteristic returned by the function (phase, intensity, frequency, etc.) and the tuple $(\xi\eta)$ represents the coordinates of a point on the surface in an arbitrary coordinate system (Cartesian, polar, parabolic, etc.). Thus, for example, $\Gamma_\phi(x,y)$, $\Gamma_I(x,y)$ and $\Gamma_\nu(x,y)$ returns the phase $\phi$, intensity I and frequency $\nu$ of the light at a point (x,y) in Cartesian coordinate system.

A profile relating to a specific optical characteristic is referred to herein as a specific profile and is termed using the respective characteristic. Thus, the term "intensity profile" refers to the intensity of the locus of all the intersecting points, the term "phase profile" refers to the phase of the locus of all the intersecting points, the term "frequency profile" refers to the frequency of the locus of all the intersecting points, and so on. Similarly to the general profile function, a specific profile function can also be represented by a two-dimensional function. For clarity of presentation, specific profile functions are denoted herein by specific notations in which the index of optical characteristic is omitted. For example, $\phi = \Gamma_\phi$, $I = \Gamma_I$, $\nu = \Gamma_\nu$ etc.

Figure 1B:
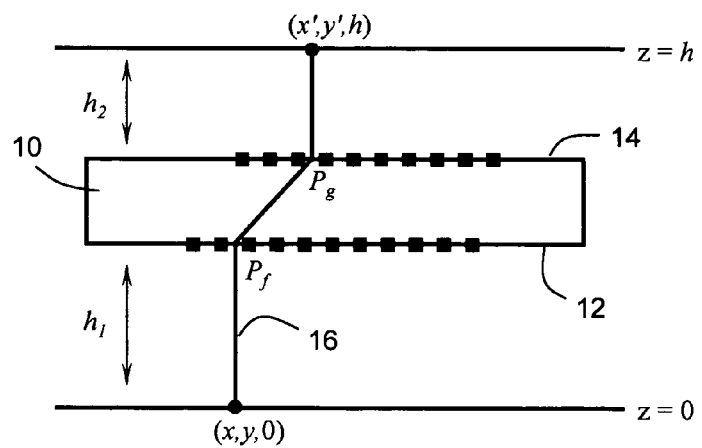

Referring now to the drawings, FIGS. 1a-b schematically illustrate a transmissive optical element 10, according to various exemplary embodiments of the present invention. In its simplest configuration, optical element 10 comprises a first surface 12 and a second surface 14. Surfaces 12 and 14 can be refractive surfaces and/or diffractive surfaces. In the representative embodiment illustrated in FIG. 1a, surfaces 12 and 14 are curved surfaces of a lens, and in the representative embodiment illustrated in FIG. 1b surfaces 12 and 14 are surfaces of a diffractive optical element. Element 10 can also serve as a Fresnel lens. In this embodiment, surfaces 12 and 14 are refractive and are split with reference to a great number of minute sections with different direction of refraction. A Fresnel lens is characterized in that it has a relatively small thickness and is substantially planar (although the minute sections are non-planar).

It is to be understood that it is not intended to limit the scope of the present invention to the embodiments shown in FIGS. 1a-b and that element 10 can include any number of surfaces of and any type and in any refractive/diffractive combination.

In various exemplary embodiments of the invention surfaces 12 and 14 are formed on the same light transmissive substrate.

Element 10 converts the profile of a light beam passing therethrough. Specifically, a light beam having a predetermined input profile enters element 10 by passing through surface 12 and exits element 10 by passing through surface 14. The outgoing light beam has a predetermined output profile, which is typically different from the input profile. For clarity of presentation, the light beam is represented in FIGS. 1a-b as a single light ray 16, but one of ordinary skill in the art would appreciate that the light beam consists more than one light ray.

The present embodiments can convert the profile of the light beam irrespectively of the symmetry of the predetermined input profile and the predetermined output profile.

The symmetry of the profile functions are typically defined in terms of symmetry operators and symmetry groups. When a symmetry operator belonging to a symmetry group Y acts on a profile function, the profile function can remain unchanged, in which case it is said that the profile function is symmetric under symmetry group Y, or it can be transformed to a different function, in which case it is said that the profile function is asymmetric under symmetry group Y. A profile function for which there is no symmetry group under which it is symmetric is referred to as totally asymmetric. A profile function can also be symmetric under more than one symmetry groups. For example, a profile function which can be written as the product of two functions whereby one function is symmetric under symmetry group $Y_1$ and the other function is symmetric under symmetry group $Y_2$, is referred to as symmetric under $Y_1$ and $Y_2$. Representative examples of symmetry groups include, without limitation, rotation, shift of one coordinate and the like.

The present embodiments are particularly useful for converting the profile of the light beam when the predetermined input profile and the predetermined output profile form an asymmetric pair of profiles.

As used herein in the specification and in the claims section below, "asymmetric pair of profiles" is a pair of profile functions having different symmetry properties. Two profile functions can have different symmetry properties, either when at least one of the profile functions is totally asymmetric or when there is at least one symmetry group under which one profile function is symmetric and the other profile function is asymmetric.

Preferably, but not obligatorily at least one of the input and output profiles is asymmetric under rotation transformation. In various exemplary embodiments of the invention at least one of the input and output profiles has explicit dependence on both coordinates in any coordinate system. It is appreciated that such explicit dependence corresponds to asymmetry under at least one transformation acting on the variables of the profile function.

According to a preferred embodiment of the present invention the variables of at least one of the input and output profiles are entangled. In other words, at least one of the input and output profiles is inseparable into two one-variable functions. This embodiment can be mathematically formulated as the condition that at least one of the input and output profiles satisfies $\Gamma_j \neq a_j b_j$, where $a_j$ and $b_j$ are functions of one variables or constants.

Yet, it is to be understood that although the conversion from and/or to asymmetric profile is preferred, situations in which both the input and output profiles have some symmetry are not excluded from the scope of the present invention.

The ability of element 10 to convert the profile of the light beam can be mathematically characterized by a mapping function which satisfies a mapping condition from the predetermined input profile into the predetermined output profile. Following is a description of the concept of ray mapping.

Consider a light beam propagating towards the positive z direction. For simplicity of this introductory description, it is assumed that the light beam is collimated, and that element 10 is used for converting the intensity profile of the light beam. However, this need not necessarily be the case, since element 10 is capable of converting both collimated and non-collimated light beams.

A representative example for converting more complicated profiles is provided hereinunder.

Thus, in the following simplified description, the wavefront of the light beam at the plane z=0 is assumed to be planar and orthogonal to the z axis, i.e., the phase is constant at z=0. The transverse plane to the z axis is parameterized by the vector $\underline{x}=(x,y)$.

Herein, throughout the specification, examples and claims, vector quantities are denoted by underlined characters.

The intensity profile at the plane z=0 is denoted by $I_1(x,y)$ or, equivalently, in vector notation $I_1(\underline{x})$. The light rays of the beam, see, e.g., ray 16 in FIGS. 1a-b, can be refracted and/or diffracted at surfaces 12 and 14 of element 10, depending on the surface properties of surfaces 12 and 14. For example, when surfaces 12 and 14 are curved surfaces of a lens, the light rays are refracted, and when surfaces 12 and 14 are surfaces of a diffractive optical element, the light rays are diffracted. The surface properties of surfaces 12 and 14 are respectively denoted by surface functions f and g, which may describe the geometrical shape of the surfaces, the diffraction functions of the surfaces and the like. It is appreciated that the surface functions describe the optical properties of surfaces 12 and 14.

For example, in the preferred embodiments in which f and g describe the geometrical shape of the surfaces, f and g return the z value of all points on the surfaces for any given projection of the points on z=0 or z=h. Hence, referring to FIG. 1a, a point $P_f$ on surface 12 has the coordinate (x, y, f(x,y)), where (x,y) is the projection of $P_f$ on z=0, and a point $P_g$ on surface 14 has the coordinate (x', y', g(x',y')), where (x',y',h) is the projection of $P_f$ on z=h.

Without the loss of generality it is assumed that surfaces 12 and 14 are formed on a light transmissive substrate having a refractive index n which is larger than unity 30 and that the surfaces are immersed in air having the refractive index $n_A=1$. It is appreciated that different applications will have different refractive index.

configurations. One of ordinary skills in the art, provided with the details described herein would know how to adjust the description for the case of other refractive indices.

In the present simplified example, once the light beam exits surface 14, it has a planar wavefront and an intensity profile $I_2(\underline{x})$ at the plane z=h. $I_2(\underline{x})$ is preferably different from $I_1(\underline{x})$. According to a preferred embodiment of the present invention the light transmissive material of element 10 is selected such that there is sufficiently low reflected intensity and sufficiently low energy absorption. Typically, the reflection and absorption coefficient characterizing the light transmissive material are each independently lower than 0.1, more preferably lower than 0.01.

The radiation conservation implies the constraint:

$$\iint I_1(\underline{x})dxdy = \iint I_2(\underline{x})dxdy. \quad (EQ. 1)$$

Each light ray intersect plane z=0 at one point and plane z=h at another point. Generally, points on plane z=0 are designated by (x,y,0) and abbreviated (x,y) and points on plane z=h are designated by (x',y',h) and abbreviated (x',y'). This is schematically illustrated in FIGS. 1a-b showing light ray 16 connecting point (x,y,0) to (x',y',h) via points $P_g$ and $P_f$ respectively lying on surfaces 12 and 14.

The relations between the points on plane z=0 and the points on plane z=h determine the profile conversion of element 10. A mapping function, $\underline{U}(\xi,\eta)$, is generally defined as mathematical transformation which maps one point $(\xi,\eta)$ to another point $(\xi',\eta')$, whereby both points share an optical path, such that, say, $(\xi',\eta')$ is "downstream" the optical path relative to $(\xi,\eta)$.

In the exemplified illustration of FIGS. 1a-b, the mapping function $\underline{U}(\underline{x})$ maps a point $\underline{x}=(x,y)$ on plane z=0 to a point $\underline{x}'=(x',y')$ on plane z=h:

$$\underline{x}' = \underline{U}(\underline{x}) = (x'(x,y), y'(x,y)). \quad (EQ. 2)$$

A ray mapping deviation $(\delta, \epsilon)$ is defined as the vector connecting point $\underline{x}$ and point $\underline{x}'$:

$$(\delta(\underline{x}), \epsilon(\underline{x})) = \underline{x}' - \underline{x} = (x'-x, y'-y). \quad (EQ. 3)$$

In terms of intensity profile, the mapping function $\underline{U}$ generally satisfies the following condition which ensures energy conservation:

$$\iint_{\underline{U}^{-1}(A)} I_1(\underline{x})d\underline{x} = \iint_A I_2(\underline{x})d\underline{x}. \quad (Eq. 4)$$

for any closed set $A \subset \mathbb{R}^2$. Equivalently, for any continuous function $\phi$ of compact support in $\mathbb{R}^2$:

$$\iint \phi(\underline{U}(\underline{x}))I_1(\underline{x})d\underline{x} = \iint \phi(\underline{x})I_2(\underline{x})d\underline{x}. \quad (EQ. 5)$$

In differential form, the energy conservation can be written as:

$$I_1(\underline{x}) = I_2(\underline{U}(\underline{x})) |J(\underline{U}(\underline{x}))|, \tag{EQ. 6}$$

where J is the Jacobian of $\underline{U}$. A mapping function $\underline{U}$ that satisfies the above energy conservation is said to "transport $I_1$ into $I_2$." This property is abbreviated hereinafter by $\underline{U}_\# I_1 = I_2$.

A mapping condition from the predetermined input profile into the predetermined output profile preferably comprises the energy conservation condition as well as a transmission condition which describes the optical phenomena occurring during the passage of light through surfaces 12 and 14 and optionally other surfaces of element 10. Representative examples for transmission conditions include, without limitation, Snell's law of refraction and diffraction equation. Thus, according to a preferred embodiment of the present invention when the light is refracted by surfaces 12 and 14, $\underline{U}(\underline{x})$ preferably satisfies a mapping condition which comprises energy conservation as well as refraction condition, and when the light is diffracted by surfaces 12 and 14, $\underline{U}(\underline{x})$ preferably satisfies a mapping condition which comprises energy conservation and diffraction condition.

While conceiving the present invention it was uncovered that the intensity profile conversion can be obtained by selecting the surfaces in accordance with a mapping function $\underline{U}(\underline{x})$ which satisfies the required mapping condition and which is a stationary function of a predetermined cost functional.

The term "stationary function" refers to a function at which the predetermined cost functional has a local minimum, a global minimum, a local maximum, a global maximum or a saddle point.

Representative examples of cost functionals and exemplified equations for calculating the corresponding mapping function are provided hereinafter (see, e.g., Equations 9-11, below).

The surface properties of surfaces 12 and 14 and optionally other surfaces of optical element 10 are related to the mapping function $\underline{U}(\underline{x})$. In other words, the knowledge of $\underline{U}(\underline{x})$ is sufficient to determine the surface properties and vise versa.

In various exemplary embodiments of the invention, the mapping deviation $(\delta, \epsilon)$ relates to a gradient of the surface function f. For example, when the light is refracted by surfaces 12 and 14 and the surface functions f and g describe the geometrical shape of surfaces 12 and 14, Snell's law of refraction reads:

$$\frac{\partial f}{\partial x} = \frac{n\delta}{R - n(g' - f)}, \quad \frac{\partial f}{\partial y} = \frac{n\varepsilon}{R - n(g' - f)} \tag{EQ. 7}$$

$$\frac{\partial g'}{\partial x} = n\frac{\delta \partial x'/\partial x + \varepsilon \partial y'/\partial x}{R - n(g' - f)}, \quad \frac{\partial g'}{\partial y} = n\frac{\delta \partial x'/\partial y + \varepsilon \partial y'/\partial y}{R - n(g' - f)}, \tag{EQ. 8}$$

where $f = f(\underline{x})$, $g' = g(\underline{x}')$, $g' - f$ is the z component of the ray vector connecting the point $P_f$ with the point $P_g$, and R is the Euclidian distance between $P_f$ and $P_g$ (see, e.g., J. Rubinstein and G. Wolansky, "Reconstruction of optical surfaces from ray data", Optical Review, 8:281-283, 2001; and Davidson et al. "Optical coordinate transformations", Appl. Opt. 31:1067-1073, 1992). According to the presently preferred embodiment of the invention the relation between the mapping deviation and the surface function f is given by $\nabla f = (n/\sqrt{(\chi - bn(\delta^2 + \epsilon^2))})(\delta, \epsilon)$, where $b = n - 1/n$, $c = R + (f - g')/n$ and $\chi = c^2 + ab$. An expression for the relation between the surface function g and the mapping function is provided hereinafter.

When the light is diffracted by surfaces 12 and 14, f and g can describe the diffraction functions of surfaces 12 and 14 and can be related to the ray's orbit. According to the presently preferred embodiment of the invention the diffraction function f satisfies $R \nabla f = (\delta, \epsilon)$, and the diffraction function g satisfies $R \nabla' g = (x(x', y') - x', y(x', y') - y')$, where $\nabla' = (\partial/\partial x', \partial/\partial y')$.

Figure 1C:
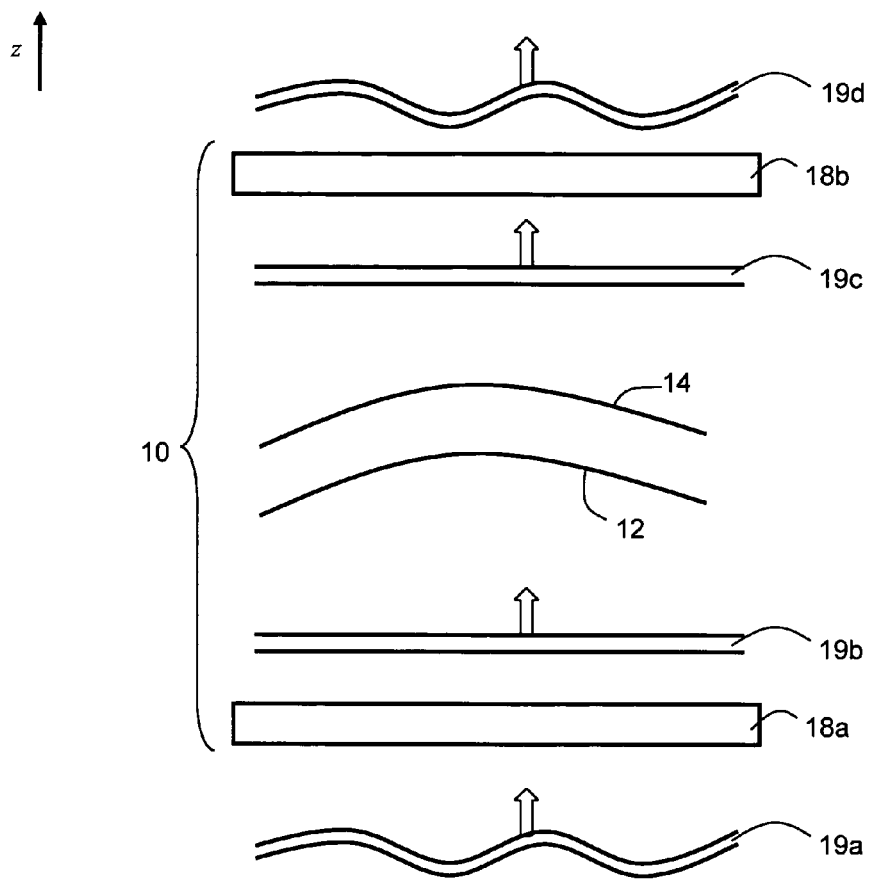
FIGS. 1c-d are simplified illustrations of the transmissive optical element in preferred embodiments in which the element comprises one or more collimators.
Figure 1D:
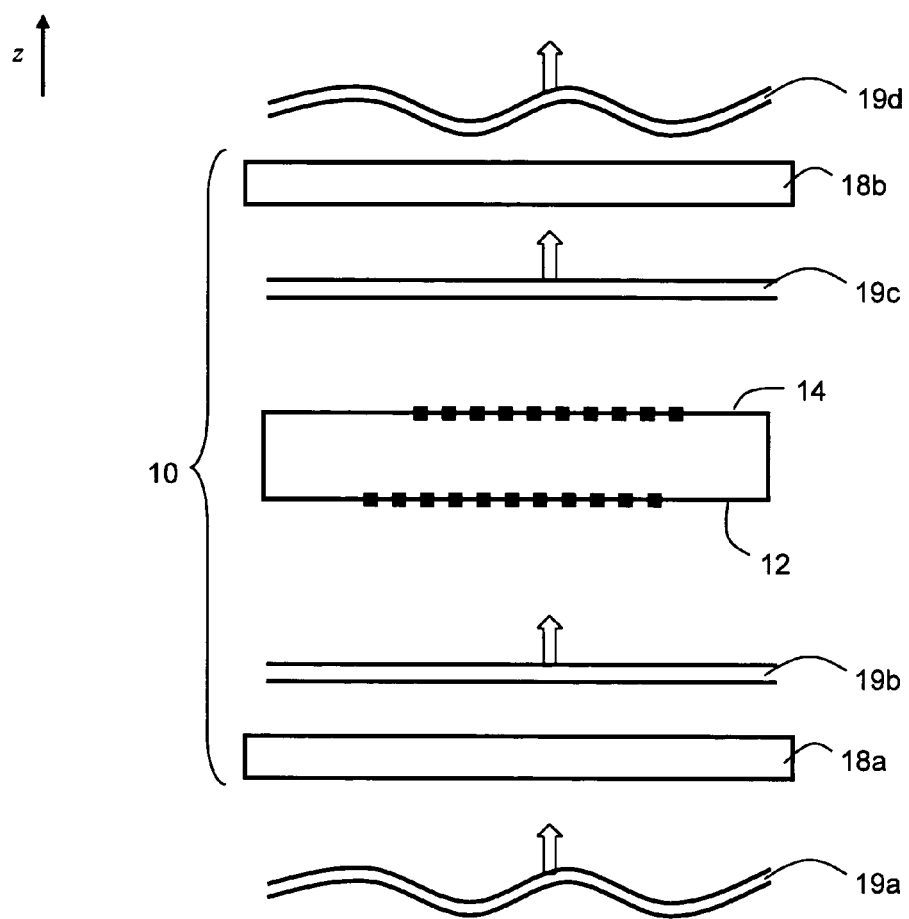

FIGS. 1c-d are simplified illustrations of optical element 10 in preferred embodiments in which element 10 comprises one or more collimators. These embodiments are useful when it is desired to convert and/or provide a non-collimated light beam. In the exemplified embodiments shown in FIGS. 1c-d, element 10 comprises two collimators 18a and 18b. A non-collimated light beam 19b having a non-planar wavefront is collimated by collimator 18a and exits collimator 18a as a collimated light beam 19b having a planar wavefront. The profile of the collimated light beam is converted by surfaces 12 and 14 as explained hereinabove and further detailed hereinafter. A collimated light beam 19c having a converted profile and a planar wavefront exits surface 14 in the direction of collimator 18b which decollimates it to provide a non-collimated light beam 19d having the converted profile and a non-planar wavefront.

Optical element 10 can have any number of collimators, depending whether or not it is desired to collimate the light prior to the impingement on surface 12 and whether or not it is desired to collimate the light subsequently to the impingement on surface 14. Generally, denoting the profile of the input light beam by $\Gamma_j^1(\xi, \eta)$ and the profile of the output light beam by $\Gamma_j^2(\xi, \eta)$, element 10 comprises collimator 18a when $\Gamma_\phi^{1}(\xi, \eta)$ describes a curved surface, and collimator 18b when $\Gamma_\phi^{2}(\xi, \eta)$ describes a curved surface. For example, when the input light beam is a non-collimated light beam and it is desired to convert the profile of the input light beam to provide a collimated light beam having a converted profile, optical element 10 preferably comprises collimator 18a, surface 12 and surface 14.

Any collimating element known in the art may be used as collimator 18a and/or collimator 18b. Typically, collimators 18a and 18b comprise collimating surfaces which can be refractive or diffractive. Representative examples of collimators suitable for the present embodiments include, without limitation, converging lenses (spherical or non spherical), an arrangement of lenses, a diffractive optical element and the like. In case of a converging lens, a light ray going through a typical converging lens that is normal to the lens and passes through its center, defines the optical axis. The bundle of rays passing through the lens cluster about this axis. Other collimating means, e.g., a diffractive optical element, may also provide collimation and decollimation functionality although for such means the optical axis is not well defined. The advantage of a converging lens is due to its symmetry about the optical axis, whereas the advantage of a diffractive optical element is due to its compactness.

Optical element 10 is thus advantageously capable of converting the profile of both collimated and non-collimated light beams passing through the optical element to a predetermined output profile which can also be either collimated or non-collimated.

Figure 2:
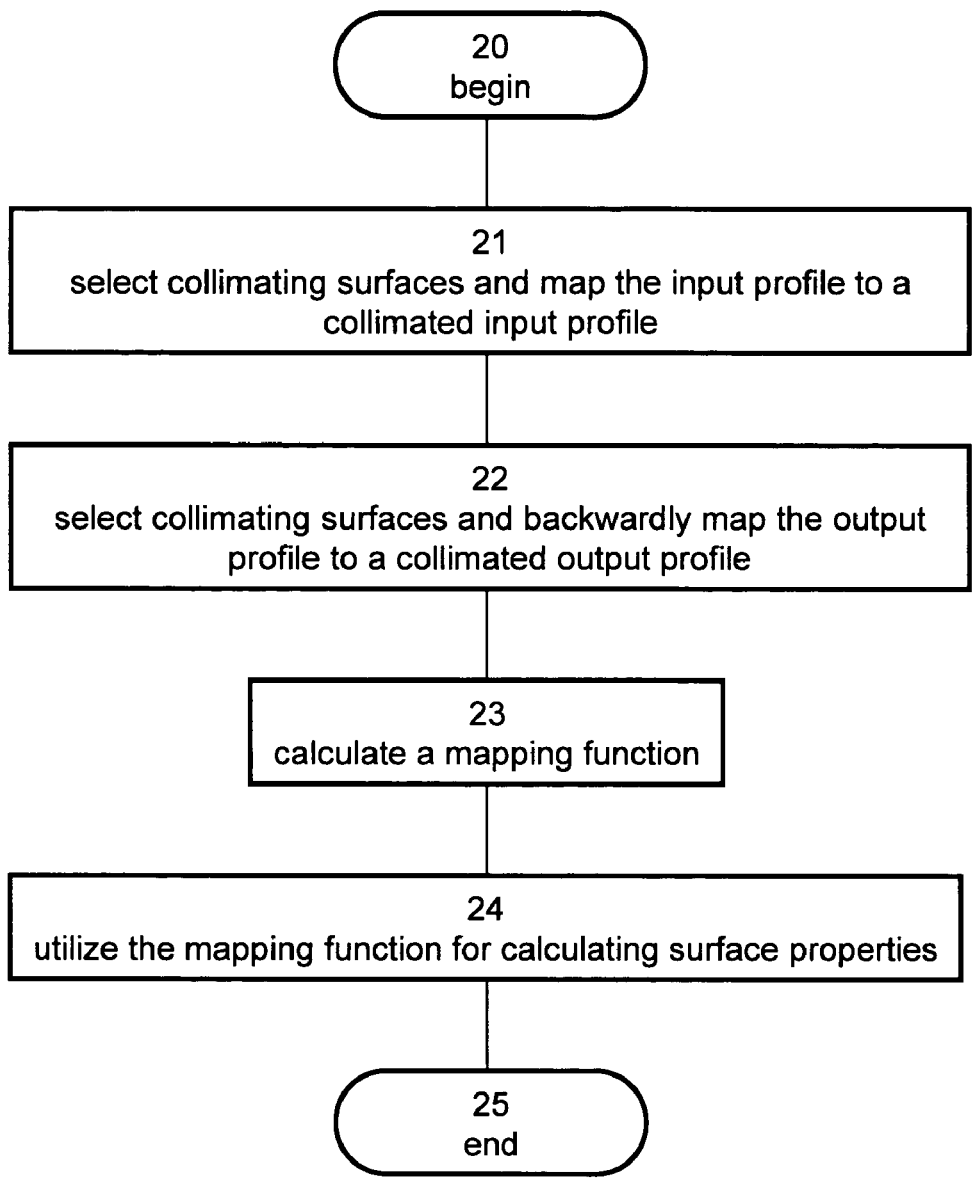
FIG. 2 is a flowchart diagram of a method suitable for designing the optical element, according to various exemplary embodiments of the present invention.

Reference is now made to the FIG. 2 which is a flowchart diagram of a method suitable for designing an optical element, according to various exemplary embodiments of the present invention. It is to be understood that, unless otherwise defined, the method steps described hereinbelow can be executed either contemporaneously or sequentially in many combinations or orders of execution. Specifically, the ordering of the flowchart of FIG. 2 is not to be considered as limiting. For example, two or more method steps, appearing in the following description or in the flowchart of FIG. 2 in a particular order, can be executed in a different order (e.g., a reverse order) or substantially contemporaneously. Additionally, one or more method steps appearing in the following description or in the flowchart of FIG. 2 are optional and may or may not be executed.

The method of the present embodiments can be embodied in many forms. For example, it can be embodied in on a tangible medium such as a computer for performing the method steps. It can be embodied on a computer readable medium, comprising computer readable instructions for carrying out the method steps. In can also be embodied in electronic device having digital computer capabilities arranged to run the computer program on the tangible medium or execute the instruction on a computer readable medium.

Computer programs implementing the method of the present embodiments can commonly be distributed to users on a distribution medium such as, but not limited to, a floppy disk, CD-ROM or flash memory. From the distribution medium, the computer programs can be copied to a hard disk or a similar intermediate storage medium. The computer programs can be run by loading the computer instructions either from their distribution medium or their intermediate storage medium into the execution memory of the computer, configuring the computer to act in accordance with the method of this invention. All these operations are well-known to those skilled in the art of computer systems.

The method begins at step 20 and optionally and preferably continues to step 21 in which a plurality of input collimating surfaces is selected and used for mapping the input profile to a collimated input profile characterized by a planar wavefront and an input intensity profile. This step is preferably executed when the input light beam is non-collimated. The collimating surfaces can be surfaces of a collimating lens or surfaces of a diffractive optical element, as further detailed hereinabove. Knowing the properties of the collimating surfaces (the shape in case of a lens having refractive collimating surfaces, and the diffraction function in case of a diffractive optical element having diffractive collimating surfaces), the mapping of the input profile to a collimated input profile can be calculated by ray tracing. Ray tracing is known in the art and found in many text books, see, e.g., O. N. Stavroudis, The Optics of Ray, Wavefronts and Caustics, Academic, New York, 1972.

According to a preferred embodiment of the present invention the method continues to step 22 in which a plurality of output collimating surfaces is selected and used for backward mapping of the output profile to a collimated output profile characterized by a planar wavefront and an input intensity profile. This step is preferably executed when it is desired to provide a non-collimated output light beam. The output collimating surfaces can be similar to the input collimating surfaces described above, and the backward mapping can be done by ray tracing as known in the art.

The method continues to step 23 in which a stationary function of a predetermined cost functional $\underline{M}(\underline{U})$ is calculated. It was found by the Inventors of the present invention that $\underline{M}(\underline{U})$ can be selected such that its stationary function satisfies a mapping condition which includes energy conservation (see, e.g., Equation 6) as well as transmission condition (refraction, diffraction) describing the optical phenomena occurring during the passage of light through the surfaces of element 10. For example, $\underline{M}$ can be selected such that it has at least a local minimum, or, more preferably a global minimum, at a stationary function which satisfies the mapping condition. Alternatively, $\underline{M}$ can be selected such that it has at least a local maximum, or, more preferably a global maximum, at a stationary function which satisfies the mapping condition. Once the stationary function of $\underline{M}$ is calculated, the mapping function $\underline{U}(\underline{x})$ is defined as the stationary function of $\underline{M}$. Typically, the calculation of the stationary function of $\underline{M}$ is by an iterative process.

A preferred expression for the cost functional $\underline{M}(\underline{U})$ is given by the following equation or any equivalent thereof:

$$\underline{M}(\underline{U}) = \int \int I_1(\underline{x}) D^*(|\underline{x} - \underline{U}(\underline{x})|) d\underline{x}. \quad (\text{EQ. 9})$$

where D* is an action quantity, also known as a Lagrangian. The action quantity is not unique and can have more than one form. The action quantity D* is preferably, but not obligatorily, convex. For example, when it is desired to design refractive surfaces (see, e.g., FIG. 1a), a suitable and preferred form for the action quantity is:

$$D^*(|s|) = \begin{cases} -\dfrac{c}{a} - \dfrac{1}{b}\sqrt{\chi - bn|s|^2} & |s| < \sqrt{\chi/bn} \\ \infty & |s| \geq \sqrt{\chi/bn} \end{cases}, \quad (\text{EQ. 10})$$

and when it is desired to design diffractive surfaces (see, e.g., FIG. 1b), a suitable and preferred form for the action quantity is:

$$D^*(|s|) = \dfrac{1}{2}|s|^2. \quad (\text{EQ. 11})$$

There is more than one way to calculate the stationary function of the cost functional M.

In one embodiment, a direct optimization is employed. In this embodiment, M is directly optimized (e.g, minimized), for example, using linear programming, dynamic optimization, stochastic simulation, a combination thereof or any other method known in the art. Linear programming, for example, is described in J. Rubinstein and G. Wolansky, "A variational principle in optics", J. Opt. Soc. Amer. A 21:2164-2172, 2004. Once a local or, more preferably a global optimum of M is found, the function at which the optimum occurs is defined as the stationary function hence also the mapping function $\underline{U}$.

In another embodiment, the stationary function is calculated by solving a predetermined evolution equation, which can be constructed by applying the variational principle on $\underline{M}$. The variational principle is a well known principle found in many text books, see, e.g., Lee et al. "Phase reconstruction by the weighted least action principle", J. of Optics A: Pure and Applied Optics, 8:279-289, 2006. The evolution equation can represent the evolution of an initial mapping function, $\underline{U}_o(\underline{x})$, which at least partially satisfies the mapping condition, along an optimization path of the functional $\underline{M}$. The optimization path for evolution can be selected in accordance with any known optimization procedure, including, without limitation, the steepest decent method, the fixed step gradient method, the conjugate gradient method, Newton's method and the like (to this end see, e.g., Angenent, et al., "Minimizing flows for the Monge-Kantorovich problem", SIAM J. Math. Anal. 35:61-97, 2003).

The evolution can be a multi-step iterative process or a continuous procedure, whereby the function is advanced during the procedure along the optimization path and being updated. Thus, starting with the initial mapping function $\underline{U}_0$, the evolution process updates the function and generate a series (or a continuum) of mapping functions until a predetermined optimization criterion is met. It is convenient to introduce an additional variable t representing the evolution process. In this notation, the initial mapping function is denoted $\underline{U}(\underline{x},0)$ and mapping functions generated during the evolution are denoted $\underline{U}(\underline{x}, t)$, where t>0.

In various exemplary embodiments of the invention the steepest decent method is employed. In these embodiments the expression $(D^*)'(\underline{U}(\underline{x},t)-\underline{x})$ is decomposed according to the Helmholtz's theorem, where $(D^*)'$ denotes the first derivative of $D^*$. Helmholtz's theorem states that any vector field can be decomposed into a divergence-free contribution and a curl-free contribution. Denoting the divergence-free contribution by $\underline{V}$ and the curl-free contribution by $\nabla P$, the decomposition of $(D^*)'(\underline{U}(\underline{x},t)-\underline{x})$ has the form:

$$(D^*)'(\underline{U}(\underline{x},t)-\underline{x})=\nabla P(\underline{x}, t) +\underline{V}(\underline{x}, t), \nabla \cdot \underline{V}(\underline{x}, t)=0 \quad \text{(EQ. 12)}$$

For example, in the embodiment in which optical element 10 has refractive surfaces, the preferred relation between the Helmholtz's decomposition and the surface functions (through the parameters $\chi$ and b defined above) is:

$$\frac{n(U(\underline{x}, t) - \underline{x})}{\sqrt{(\chi + bn | U(\underline{x}, t) - \underline{x}|^2}} = \nabla P(\underline{x}, t) + V(\underline{x}, t). \quad \text{(EQ. 13)}$$

The evolution equation can be any equation having the property that the cost functional $\underline{M}$ decreases along the flow of the mapping functions $\underline{U}(\underline{x}, t)$, while the flow satisfies the conservation of energy. According to a preferred embodiment of the present invention the evolution equation is:

$$I_1 \frac{\partial}{\partial t} U(\underline{x}, t) + V(\underline{x}, t)\nabla U(\underline{x}, t) = 0. \quad \text{(EQ. 14)}$$

In another preferred embodiment, the Helmholtz's decomposition of $(D^*)'(\underline{U}(\underline{x},t)-\underline{x})$ has the form:

$$(D^*)'(\underline{U}(\underline{x},t)-\underline{x})=\nabla P(\underline{x},t)+\underline{V}(\underline{x},t), \nabla \cdot (I_1 \underline{V}(\underline{x},t))=0 \quad \text{(EQ. 15)}$$

and the evolution equation is:

$$\frac{\partial}{\partial t} U(\underline{x}, t) + V(\underline{x}, t)\nabla U(\underline{x}, t) = 0 \quad \text{(EQ. 16)}$$

Other evolution equations are also contemplated. Since the evolution equations decrease $\underline{M}$ along the flow $\underline{U}(\underline{x}, t)$, and in addition the entire flow transports $I_1$ into $I_2$, the flow converges to a mapping function which is a minimizer of $\underline{M}$.

Algorithms for selecting the initial mapping function $\underline{U}(\underline{x}, 0)$ and for solving evolution equations are known in the art and are found, for example, in Lee et al., supra. In various exemplary embodiments of the invention the evolution equation is solved by an iterative process. In these embodiments, the iterative process continues until one or more stopping criteria are met. Many stopping criteria are contemplated, including, without limitation, that the contribution $\underline{V}$ of Equations 13 and 14 is smaller than a predetermined threshold, or that the energy decrease during a particular iteration step is lower than a predetermined threshold.

Once the mapping function is calculated, the method continues to step 24 in which the mapping function is utilized for calculating the surface properties of surface 12 and 14 of optical element 10. The surface properties, as stated, are expressed through the surface functions f and g. In various exemplary embodiments of the invention, the mapping function $\underline{U}$ is used for calculating the gradient of f, and the inverse of the mapping function is used for calculating the gradient of g.

In the embodiment in which optical element 10 has refractive surfaces, the gradients of f and g can be calculated as follows:

$$\nabla f(\underline{x}) = \frac{-n(U(\underline{x}) - \underline{x})}{\sqrt{(\chi - bn|U(\underline{x}) - \underline{x}|^2}}, \quad \text{(EQ. 17)}$$

$$\nabla g(\underline{x}) = \frac{-n(\underline{x} - U^{-1}(\underline{x}))}{\sqrt{(\chi - bn|\underline{x} - U^{-1}(\underline{x})|^2}}. \quad \text{(EQ. 18)}$$

In the embodiment in which optical element 10 has diffractive surfaces, the gradients of f and g can be calculated as follows:

$$\nabla f(\underline{x}) = \frac{U(\underline{x}) - \underline{x}}{R}, \quad \text{(EQ. 19)}$$

$$\nabla g(\underline{x}) = \frac{\underline{x} - U^{-1}(\underline{x})}{R}. \quad \text{(EQ. 20)}$$

where in Equations 19 and 20 R is given by (confer FIG. 1b for definition of $h_1$, $h_2$ and h):

$$R=\sqrt{\delta^2+\epsilon^2+(h-h_1+h_2)^2} \quad \text{(EQ. 21)}$$

It is noted that R, as defined in Equation 21 above, is a constant, because the expression $(h-h_1-h_2)$, up to a constant, the optical path between the incident and outgoing wavefronts. Once the gradients are known f and g are preferably calculated by integration.

The method ends at step 25.

Figure 3:
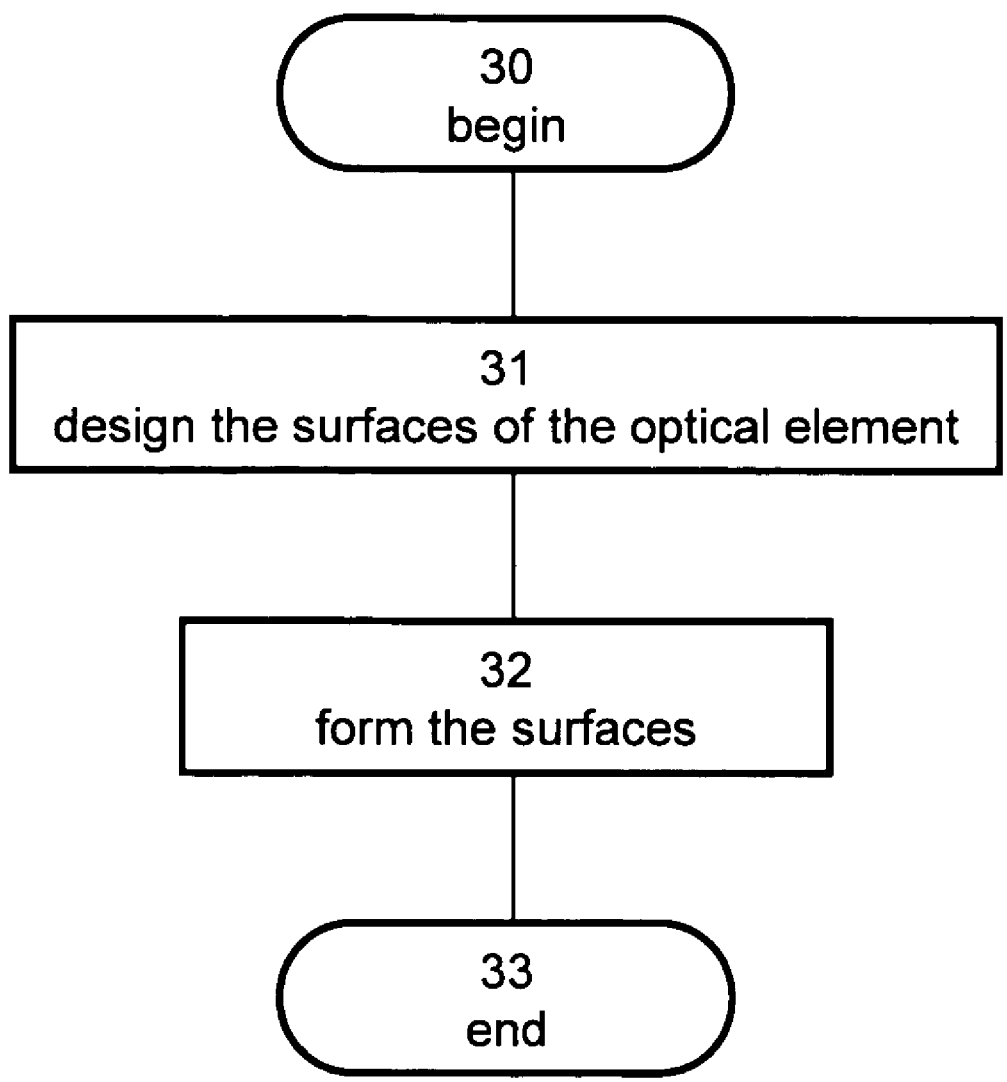
FIG. 3 is a flowchart diagram of a method for manufacturing a transmissive optical element, according to various exemplary embodiments of the present invention.

Reference is now made to FIG. 3 which is a flowchart diagram of a method for manufacturing a transmissive optical element, according to various exemplary embodiments of the present invention.

The method begins at step 30 and continues to step 31 in which the surfaces of the transmissive optical element are designed as further detailed hereinabove. When it is desired to manufacture a Fresnel lens, the design step of surfaces 12 and 14 further comprises calculating the minute sections of the Fresnel lens, based on the surface functions f and g. Methods for calculating minute sections are known in the art and are found, e.g., in many articles and text books, see, e.g., a book by W. J. Smith, entitled "Modem Optical Engineering", published on 1990 by McGraw-Hill.

The method continues to step 32 in which the surfaces of the optical element are formed. The surfaces can be formed by any way known in the art. For example, when surfaces 12 and 14 are curved surfaces of a lens, a computer numerical control (CNC) machine can be employed. The surface functions f and g (or the minute sections of the Fresnel lens, if a Fresnel lens is manufactured) are programmed into a control unit of the CNC machine which can then be used to fabricate suitable molds for surfaces 12 and 14. In cases in which element 10 comprises collimating surfaces, the control unit can be inputted with surface functions of conventional collimating surfaces. When surfaces 12 and 14 are diffractive surfaces, they can be formed using a ruling engine, e.g., by burnishing grooves with a diamond stylus on a light transmissive substrate, or by a combination of lithography and etching techniques, e.g., by recording the diffraction functions on a photosensitive layer deposited on a light transmissive substrate and selectively etching the light transmissive substrates to provide diffraction gratings thereon.

The method ends at step 33.

Figure 4A:
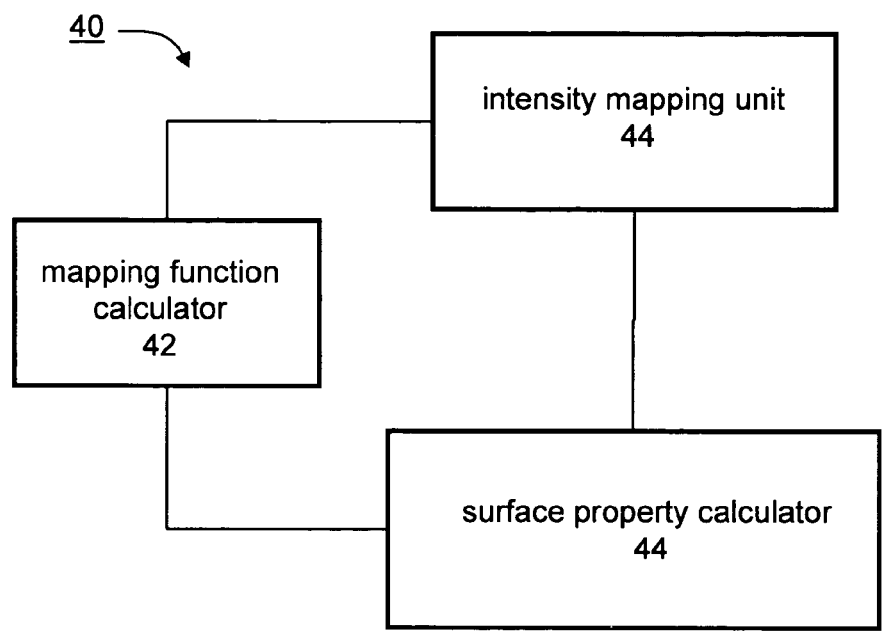
FIGS. 4a-c are schematic illustrations of an apparatus for designing the transmissive optical element, according to various exemplary embodiments of the present invention.
Figure 4B:
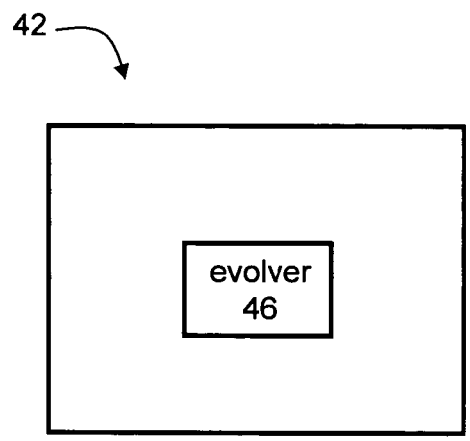
Figure 4C:
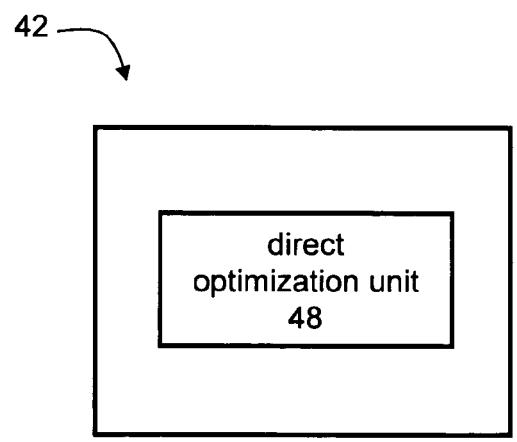

Reference is now made to FIGS. 4a-c which are simplified illustrations of an apparatus 40 for designing a transmissive optical element, according to various exemplary embodiments of the present invention. Apparatus 40 comprises a stationary function calculator 42 which calculates the stationary function of the predetermined cost functional to provide the mapping function, and a surface property calculator 44 which utilizes the mapping function for calculating the surface properties of the surfaces as further detailed hereinabove. Calculator 42 can comprise, for example, an evolver 46 (see FIG. 4b) which solves a predetermined evolution equation, e.g., by selecting an initial mapping function and evolving it using the evolution equation, as further detailed hereinabove. Alternatively, or additionally, calculator 42 can comprise a direct optimization unit 48 (see FIG. 4c) which directly optimizes M to find the stationary function as further detailed hereinabove.

In various exemplary embodiments of the invention apparatus 40 comprises an intensity mapping unit 44 which receives surface data of input and/or output collimating surfaces and uses the surface data for mapping or the input profile to a collimated input profile and/or backward mapping the output profile to a collimated output profile, as further detailed hereinabove.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds support in the following examples.

EXAMPLES

Reference is now made to the following examples, which together with the above descriptions illustrate the invention in a non limiting fashion.

Example 1

Derivation of Relation Between Mapping Function and Surface Functions

Following is a description of the derivation of the relation between the mapping function and the surface functions, for the case of refractive optical element. The mathematical procedure, according to various exemplary embodiments of the present invention, includes minimization of an appropriate cost functional and is directed to find a mapping function $\underline{U}$ that satisfies both energy conservation and light refraction.

A system of equations of the form of Equations 7 and 8 above can be solved by implying certain compatibility conditions which can give rise to a specific constraint on the mapping function $\underline{U}$.

R, the Euclidian distance between $P_f$ and $P_g$ is related to g'-f, the z component of the ray vector connecting $P_f$ with $P_g$ (see FIG. 1a) through the optical path length l of a ray starting at (x, y, 0) and ending at (x', y', h):

$$l = f + nR + h - g'. \quad (EQ. 22)$$

Therefore R=(g'-j)/n+(l-h)/n. This identity is substituted into Equations 7 and 8, while subtracting the first pair of equations from the second pair. For a collimated input light beam and a collimated output light beam, both z=0 and z=h are wavefronts and the optical path length l is constant, hence $$\frac{\partial(g'-f)}{\partial x} = n \frac{\delta \partial \delta/\partial x + \varepsilon \partial \varepsilon/\partial x}{c - b - (g' - f)} \text{ and} \quad (EQ. 23)$$

$$\frac{\partial(g'-f)}{\partial y} = n \frac{\delta \partial \delta/\partial y + \varepsilon \partial \varepsilon/\partial y}{c - b(g' - f)}, \quad (EQ. 24)$$

where, as stated above, b=n-1/n and c=R+(f-g')/n=(1-h)/n.

Equations 23 and 24 can be expressed as $$\frac{\partial}{\partial x}(-b(g'-f)^2 + 2c(g'-f)) = n \frac{\partial}{\partial x}(\delta^2 + \varepsilon^2), \text{ and} \quad (EQ. 25)$$

$$\frac{\partial}{\partial y}(-b(g'-f)^2 + 2c(g'-f)) = n \frac{\partial}{\partial y}(\delta^2 + \varepsilon^2) \quad (EQ. 26)$$

respectively. Therefore f-g' is related to $\delta^2 + \epsilon^2$ through the following quadratic equation:

$$-b(f-g')^2 + 2c(f-g') - n(\delta^2 + \epsilon^2) + a = 0, \quad (EQ. 27)$$

where a is a constant. Solving for (f-g') one obtains:

$$g' - f = \frac{c}{b} \pm \frac{1}{b}\sqrt{\chi - bn(\delta^2(x) + \varepsilon^2(x))}, \quad (EQ. 28)$$

where, as stated $\chi = c^2 + ab$. $\partial f/\partial x$ and $\partial f/\partial y$ can then be found by substituting Equation 28 into Equation 7:

$$\frac{\partial f}{\partial x} = \mp \frac{-n\delta}{\sqrt{\chi - bn(\delta^2 + \varepsilon^2)}}, \quad (EQ. 29)$$

$$\frac{\partial f}{\partial y} = \mp \frac{-n\varepsilon}{\sqrt{\chi - bn(\delta^2 + \varepsilon^2)}}.$$

Snell's law implies that for n>1, $\nabla f$ and $\underline{U}(\underline{x}) - \underline{x}$ point in opposite directions. Therefore, the minus sign is chosen in Equation 29:

$$\frac{\partial f}{\partial x} = \frac{-n\delta}{\sqrt{\chi - bn(\delta^2 + \varepsilon^2)}}, \quad (EQ. 30)$$

$$\frac{\partial f}{\partial y} = \frac{-n\varepsilon}{\sqrt{\chi - bn(\delta^2 + \varepsilon^2)}}.$$

Thus, the deviation vector $(\delta, \epsilon)$ which is related to the mapping function $\underline{U}(\underline{x})$ is preferably selected such the right hand side of Equation 30 is a gradient of some function.

Equation 30 describes light refraction condition, and can be solved together with Equation 6 above which describes energy conservation. As stated, the procedure preferably involves minimization of a cost functional. It should be noted that the optimization process described below does not mean that the design goal is approximately achieved as a compromise of conflicting design requirements. Rather, the optimization process described below successfully provides solution of equations 6 and 30.

The optimization problem derived below is related to the weighted least action concept introduced in the 2004 article of J. Rubinstein and G. Wolansky, supra. The specific action that is used in the present example is the one associated with the Klein-Gordon equation. Consider the cost function $\underline{M}$ presented in Equation 9 and the Lagrangian D* presented in Equation 10.

It is convenient to look also at a definition related to the cost functional $\underline{M}$: A density function $\lambda(\underline{x}, \underline{y}) R^2 \times R^2$ is said to be in the space $\Lambda(I_1, I_2)$ if its x and y marginal densities are given by $I_1$ and $I_2$, respectively. That is:

$$\iiiint (\phi(\underline{x}) + \psi(\underline{y}))\lambda(\underline{x}, \underline{y}) d\underline{x} d\underline{y} = \iint I_1(\underline{x}) \phi(\underline{x}) d\underline{x} + \iint I_2(\underline{x}) \psi(\underline{x}) d\underline{x},$$  (EQ. 31)

for any pair of continuous functions $\phi, \psi$ with compact support in $R^2$. For any density function $\lambda$ in $\Lambda$ the Kantorovich relaxation of the cost functional is defined as:

$$\underline{K}(\lambda) = \iiint D^*(|\underline{x} - \underline{x}'|) \lambda(\underline{x}, \underline{x}') d\underline{x} d\underline{x}'.$$  (EQ. 32)

It will now be shown that a mapping function $\underline{U}$ that is a stationary function of $\underline{M}$ and that satisfy the constraint of Equation 6 can be used for determining the surface functions $f(\underline{x})$ and $g(\underline{x})$ using Equations 17 and 18.

To justify this statement, the first variation of $\underline{M}$ is calculated under the constraint of Equation 6. The calculation of the first variation is based on a useful decomposition of intensity transporting mappings that was proposed in Y. Brenier, "Polar factorization and monotone rearrangement of vector-valued functions", Comm. Pure Appl. Math. 64:375-417, 1991.

Let T be a fixed mapping function satisfying $I_2(T(\underline{x}))|J(T(\underline{x}))|=I_1(\underline{x})$, and let S be the set of mapping functions from the plane to itself that transports $I_1$ to itself, i.e., $S_\# I_1 = I_1$ for all $S \in S$. Such mapping functions are called $I_1$-preserving. Then, any mapping function $\underline{U}$ transporting $I_1$ to $I_2$ can be written as $\underline{U} = T \circ S^{-1}$ for some $S \in S$.

To facilitate the computation of the first variation, the functional $\underline{M}$ is replaced by the Kantorovich relaxation $\underline{K}$ (see Equation 32) with the following choice for the density function $\lambda$:

$$\lambda_{\underline{U}}(\underline{x}, \underline{x}') = I_1(\underline{x}) \delta(\underline{x}' - \underline{U}(\underline{x})).$$  (EQ. 33)

Since $\underline{U}_\# I_1 = I_1$ it follows that $\lambda_{\underline{U}} \in \Lambda(I_1, I_2)$. Furthermore, since the mapping function T is fixed, it follows that $\underline{K}(\underline{U})$ depends on $S \in S$. Setting $\underline{U}_{(S)} = T \circ S^{-1}$ the following expression for $\underline{K}(\underline{U}_{(S)})$ is obtained:

$$K(U_{(S)}) = \iiiint D^*(|\underline{x} - \underline{x}'|) I_1(\underline{x}) \delta(\underline{x}' - T(S^{-1}(x))) d\underline{x} d\underline{x}'$$  (EQ. 34)

-continued
$$= \iint D^*(|\underline{x} - T(S^{-1}(x))|) I_1(\underline{x}) d\underline{x}.$$

The calculation of the first variation of $\underline{K}$ requires exploring a neighborhood of the mapping function $\underline{U}$. It is convenient to introduce for this purpose the parameter $\tau$ and to use it to parameterize the family of mapping functions S. Specifically, $S^{(\tau)}$ defines an orbit in S for $\tau \in R$. $S^{(0)}$ is conveniently selected to be the identity mapping function.

The parameterized flow $S^{(\tau)}(\underline{x})$ is substituted into Equation 34. Since $S^{(\tau)}_\# I_1 = I_1$, the transport relation presented in Equation 5 can be used with $S^{(\tau)}$ replacing $\underline{U}$, and $I_1$ replacing the target intensity $I_2$ in the r.h.s of Equation 5. With these replacements, Equation 34 becomes:

$$K(U_{(S)}) = \iint D^*(|\underline{x} - T([S^{(\tau)}]^{-1}(x))|) I_1(\underline{x}) d\underline{x}$$  (EQ. 35)
$$= \iint D^*(|S^{(\tau)}(\underline{x}) - T(\underline{x})|) I_1(\underline{x}) d\underline{x}.$$

Differentiating Equation 35 at the point $\tau = 0$ one obtains:

$$\frac{d}{d\tau} K(U_{(S^{(\tau)})})\bigg|_{\tau=0} = \iint \nabla D^*(|\underline{x} - T(\underline{x})|) \cdot \underline{w}(\underline{x}) I_1(\underline{x}) d\underline{x}$$  (EQ. 36)
$$= \iint (D^*)'(|\underline{x} - T(\underline{x})|) \frac{\underline{x} - T(\underline{x})}{|\underline{x} - T(\underline{x})|} \cdot \underline{w}(\underline{x}) I_1(\underline{x}) d\underline{x},$$

where (D*)' is the derivative of the Lagrangian D*, and $\underline{w}$ is the "velocity" of the flow $S^{(\tau)}(\underline{x})$, defined by:

$$\frac{d}{d\tau} S^{(\tau)}(\underline{x}) = \underline{w}(S^{(\tau)}(\underline{x})).$$  (EQ. 37)

Notice that the condition $S^{(\tau)} \in S$ for all $\tau \in R$ implies that $\underline{w}$ satisfies the equation:

$$\nabla \cdot (I_1(\underline{x}) \underline{w}(\underline{x})) = 0$$  (EQ. 38)

The mapping function T, defined by $T = U_{S^{(0)}}$, is a critical point of $\underline{M}$ if and only if the r.h.s of Equation 36 is zero for any $\underline{w}$ satisfying Equation 38. According to the Helmholtz theorem of vector fields, the coefficient of $I_1 \underline{w}$ in Equation 36 can be decomposed into a solenoidal (divergence-free) contribution, which can be viewed as a curl of some vector potential, and an irrotational (curl-free) contribution, which can be viewed as a gradient of some scalar potential $\Phi$. Upon substituting the Helmholtz decomposition into Equation 36, the following equation for $\underline{x} - T(x)$ is obtained:

$$(D^*)'(|\underline{x} - T(\underline{x})|) \frac{\underline{x} - T(\underline{x})}{|\underline{x} - T(\underline{x})|} = \nabla \Phi.$$  (EQ. 39)

From the above definition of D* (see Equation 10) it follows that Equation 39 is compatible with Equation 30 upon setting $\Phi = f$.

Upon a proper selection of the relation between $\underline{w}$, the flow velocity, and $\underline{V}$, the divergence-free contribution of (D*)', the evolution equation can be constructed. For example, Equation 14 corresponds to the selection $V=\underline{w}/I_1$, while Equation 16 corresponds to the selection $V=\underline{w}$.

Example 2

Conversion of a Collimated Light Beam with Uniform Intensity Profile

A transmissive optical element having two refractive surfaces was designed in accordance with a preferred embodiment of the present invention. The surfaces were designed for converting a light beam characterized by a planar wavefront and a uniform intensity profile, $I_1(x,y)=1$. The output light beam had also planar wavefront, hence no collimating surfaces were selected.

Figure 5A:
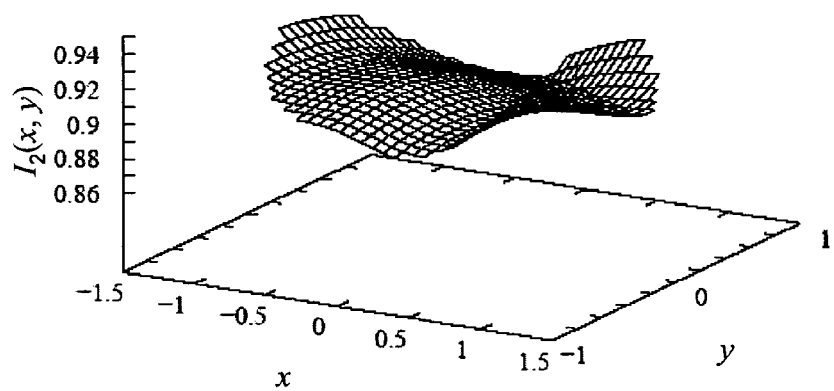
FIG. 5a shows asymmetric output intensity profile converted from a uniform input intensity profile, according to various exemplary embodiments of the present invention.

The output profile had an asymmetric intensity profile $I_2(x, y)$ shown in FIG. 5a. As shown, the predetermined output intensity profile $I_2(x, y)$ has no symmetry, and has a general shape, neither strictly convex nor strictly concave.

Figure 5B:
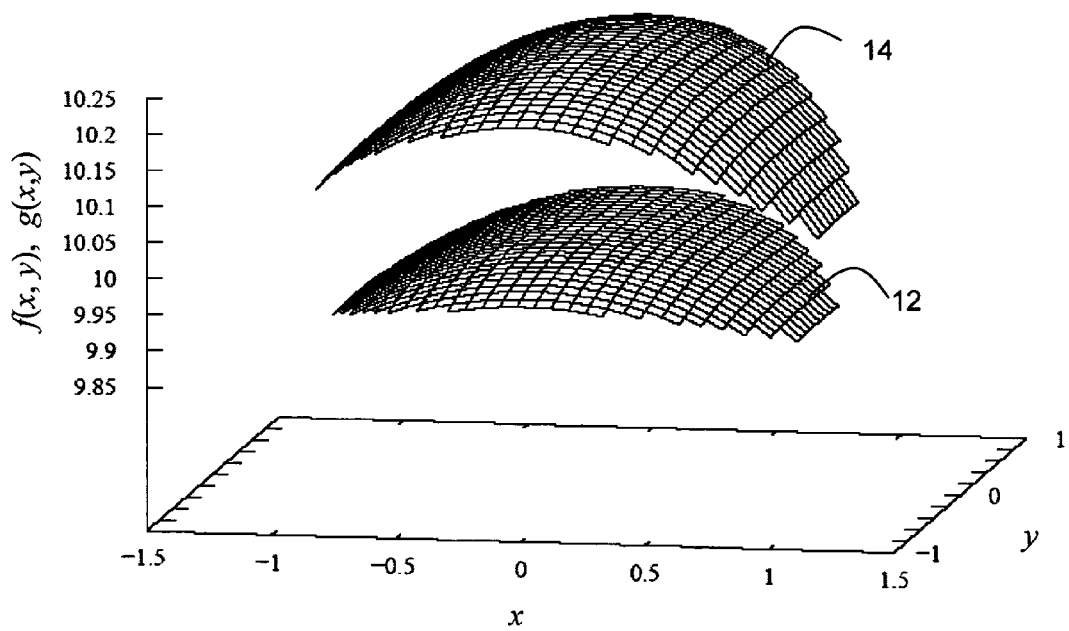

FIG. 5b shows the shapes $f(x,y)$ and $g(x,y)$ of surfaces 12 and 14, respectively, as calculated by the method of the present embodiments.

It is therefore demonstrated that the techniques of the present embodiments successfully design transmissive surfaces for converting the profile of the light beam with no symmetry assumptions.

Example 3

Conversion of a Hollow Light Beam

Figure 6A:
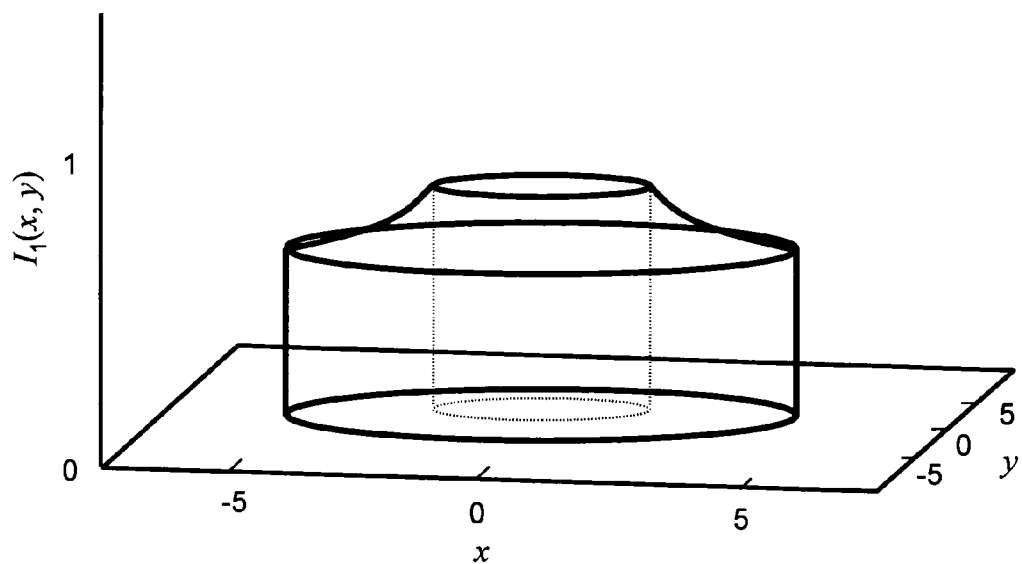
FIG. 6a is a schematic illustration of a decreasing input intensity profile of a hollow light beam.

A transmissive optical element having two refractive surfaces was designed in accordance with a preferred embodiment of the present invention. The surfaces were designed for converting an input hollow light beam having a decreasing intensity profile which is non-zero only in an annulus. The input intensity profile $I_1(x,y)$ in Cartesian coordinate system is schematically illustrated in FIG. 6a. In polar coordinate system, the input intensity profile $I_1$ has the form:

$$I_1(r) = \begin{cases} 1 + \dfrac{1}{4r} & 1 \leq r \leq 5 \\ 0 & \text{otherwise} \end{cases} \quad (\text{EQ. 40})$$

where r is defined by $r^2=x^2+y^2$.

Figure 6B:
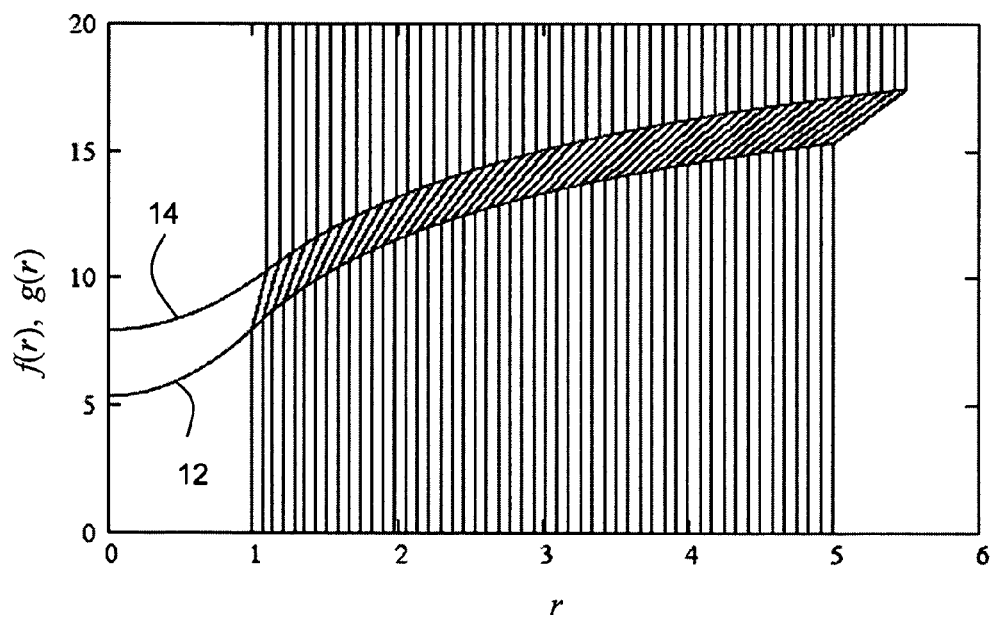
FIG. 6b illustrates a radial cross section of shapes of surfaces calculated according to various exemplary embodiments of the present invention so as to allow conversion of the input intensity profile illustrated in FIG. 6a to a uniform intensity profile.

The surfaces were designed for converting the input hollow light beam into an output light beam having uniform intensity profile $I_2=1$ over its support. The surfaces were calculated first over the area reached by light rays in the beams. Subsequently, the calculation was completed inside the annulus by requiring smoothness of the surfaces and vertex at the origin. A radial cross section of the shapes $f(r)$ and $g(r)$ of surfaces 12 and 14 respectively is depicted in FIG. 6b. Also shown in FIG. 6b is the mapping from the input light rays to the output light rays. Note that the both surfaces are extended to the inner side of the annulus (r<1).

It is therefore demonstrated that the techniques of the present embodiments successfully design transmissive surfaces for converting a complicated intensity profile of a light beam into a uniform intensity profile.

It is appreciated that certain features of the invention, which, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of designing a transmissive optical element for converting a profile of a light beam from a predetermined input profile to a predetermined output profile, the method comprising:

calculating a stationary function of a predetermined cost functional selected such that said stationary function satisfies a mapping condition for mapping the predetermined input profile into the predetermined output profile, thereby providing a mapping function; and utilizing said mapping function for calculating surface properties of at least a first surface and a second surface of the transmissive optical element and displaying or outputting said surface properties to a computer readable medium, thereby designing the transmissive optical element.

2. The method of claim 1, wherein the predetermined input profile comprises a predetermined input intensity profile, and the predetermined output profile comprises a predetermined output intensity profile.

3. The method of claim 1, wherein said mapping condition comprises energy conservation and transmission condition.

4. The method of claim 1, wherein said calculating said stationary function comprises solving a predetermined evolution equation.

5. The method of claim 1, wherein said calculating said stationary function comprises performing an iterative process.

6. The method of claim 4, wherein said calculating said mapping function comprises selecting an initial mapping function at least partially satisfying said mapping condition, and evolving said initial mapping function using said predetermined evolution equation.

7. The method of claim 1, wherein the predetermined input profile and the predetermined output profile form an asymmetric pair of profiles.

8. The method of claim 1, wherein said calculating said surface properties comprises calculating a shape of said first surface and a shape of said second surface.

9. The method of claim 1, wherein said calculating said surface properties comprises calculating a diffraction function of said first surface and a diffraction function of said second surface.

10. The method of claim 1, wherein at least one of the predetermined input profile and the predetermined output profile is characterized by a substantially planar wavefront.

11. The method of claim 1, wherein the predetermined input profile is characterized by a non-planar wavefront.

12. The method of claim 11, further comprising selecting a plurality of input collimating surfaces and using said plurality of input collimating surfaces for mapping the input profile to a collimated input profile characterized by a planar wavefront and an input intensity profile.

13. The method of claim 1, wherein the predetermined output profile is characterized by a non-planar wavefront.

14. The method of claim 13, further comprising selecting a plurality of output collimating surfaces and using said plurality of output collimating surfaces for backward mapping the output profile to a collimated output profile characterized by a planar wavefront and an output intensity profile.

15. The method of claim 1, wherein said calculating said surface properties comprises, using said mapping function for calculating a gradient of a surface function describing properties of said first surface, using an inverse of said mapping function for calculating a gradient of a surface function describing properties of said second surface, and calculating said surface properties based on said gradients.

16. A transmissive optical element designed by the method of claim 1.

17. A method of manufacturing a transmissive optical element, comprising executing the method of claim 1 thereby designing said first surface and said second surface and forming said first surface and said second surface thereby manufacturing the transmissive optical element.

18. A method of designing a transmissive optical element, comprising:
receiving an input intensity profile and an input phase profile;
receiving an output intensity profile and an output phase profile, said input and said output intensity profiles forming an asymmetric pair; and
employing an optimization procedure for calculating surface properties of at least a first surface and a second surface of the transmissive optical element, and displaying or outputting said surface properties to a computer readable medium, thereby designing the transmissive optical element.

19. The method of claim 18, wherein said optimization procedure comprises calculation of a stationary function of a predetermined cost functional.

20. The method of claim 19, wherein said predetermined cost functional is selected such that said stationary function satisfies a mapping condition for mapping said input intensity profile into said output intensity profile.

21. The method of claim 19, wherein said mapping condition comprises energy conservation and transmission condition.

22. A method of manufacturing a transmissive optical element, comprising executing the method of claim 17 thereby designing said first surface and said second surface and forming said first surface and said second surface thereby manufacturing the transmissive optical element.

23. Apparatus for designing a transmissive optical element for converting a profile of a light beam from a predetermined input profile to a predetermined output profile, the apparatus comprising:
a stationary function calculator, configured to calculate a stationary function of a predetermined cost functional selected such that said stationary function satisfies a mapping condition for mapping the predetermined input profile into the predetermined output profile, thereby to provide a mapping function; and
a surface property calculator, configured to utilize said mapping function for calculating surface properties of at least a first surface and a second surface of the transmissive optical element.

24. The apparatus of claim 23, wherein the predetermined input profile comprises a predetermined input intensity profile, and the predetermined output profile comprises a predetermined output intensity profile.

25. The apparatus of claim 23, wherein said mapping condition comprises energy conservation and transmission condition.

26. The apparatus of claim 23, wherein said stationary function calculator comprises an evolver configured to solve a predetermined evolution equation.

27. The apparatus of claim 26, wherein said evolver is configured to select an initial mapping function at least partially satisfying said mapping condition, and to evolve said initial mapping function using said predetermined evolution equation.

28. The apparatus of claim 23, wherein the predetermined input profile and the predetermined output profile form an asymmetric pair of profiles.

29. The apparatus of claim 27, wherein said surface property calculator is configured to calculate a shape of said first surface and a shape of said second surface.

30. The apparatus of claim 27, wherein said surface property calculator is configured to calculate a diffraction function of said first surface and a diffraction function of said second surface.

31. The apparatus of claim 23, wherein at least one of the predetermined input profile and the predetermined output profile is characterized by a substantially planar wavefront.

32. The apparatus of claim 23, wherein the predetermined input profile is characterized by a non-planar wavefront.

33. The apparatus of claim 32, further comprising an intensity mapping unit configured to receive surface data of a plurality of input collimating surfaces and to use said surface data for mapping the input profile to a collimated input profile characterized by a planar wavefront and an input intensity profile.

34. The apparatus of claim 23, wherein the predetermined output profile is characterized by a non-planar wavefront.

35. The apparatus of claim 3, further comprising an intensity mapping unit configured to receive surface data and to use said surface data for backward mapping the output profile to a collimated output profile characterized by a planar wavefront and an output intensity profile.

36. The apparatus of claim 23, wherein said surface property calculator is configured for using said mapping function to calculate a gradient of a surface function describing properties of said first surface, using an inverse of said mapping function to calculate a gradient of a surface function describing properties of said second surface, and calculating said surface properties based on said gradients.

37. A transmissive optical element designed by the apparatus of claim 23.

38. A transmissive optical element, comprising at least a first surface and a second surface designed and constructed for converting a profile of a light beam from a predetermined input profile to a predetermined output profile, wherein the predetermined input profile and the predetermined output profile form an asymmetric pair of profiles;
wherein said first surface and said second surface are characterized by a mapping function satisfying a mapping condition from the predetermined input profile into the predetermined output profile, wherein said mappina function has a predetermined relation to a gradient of said first surface and a gradient of said second surface, and is a stationary function of a predetermined cost functional.

39. The transmissive optical element of claim 38, wherein the predetermined input profile comprises a predetermined input intensity profile, and the predetermined output profile comprises a predetermined output intensity profile.

40. The transmissive optical element of claim 38, wherein said first surface and a second surface are curved surfaces of a lens.

41. The transmissive optical element of claim 38, wherein said first surface and a second surface are surfaces of a diffractive optical element.

42. The transmissive optical element of claim 38, wherein at least one of the predetermined input profile and the predetermined output profile is characterized by a substantially planar wavefront.

43. The transmissive optical element of claim 38, wherein the predetermined input profile is characterized by a non-planar wavefront.

44. The transmissive optical element of claim 38, further comprising at least one collimator for collimating light prior to impingement on said first surface and/or decollimating light subsequently to impingement on said second surface.

45. The transmissive optical element of claim 38, wherein said mapping condition comprises energy conservation and transmission condition.

46. The transmissive optical element of claim 38, wherein at least one of said input profile and said output profile is inseparable into two one-variable functions.

* * * * *